United States Patent [19]
Binder et al.

[11] Patent Number: 4,622,856
[45] Date of Patent: Nov. 18, 1986

[54] SENSOR WITH POLYCRYSTALLINE SILICON RESISTORS

[75] Inventors: Josef Binder; David Cutter, both of Munich; Wolfgang Henning, Zorneding; Hans-Christian Schaber, Germering; Frank Möllmer, Pentling; Hansjörg Reichert, Munich, all of Fed. Rep. of Germany

[73] Assignee: Siemens Aktiengesellschaft, Berlin and Munich, Fed. Rep. of Germany

[21] Appl. No.: 614,265

[22] Filed: May 25, 1984

[30] Foreign Application Priority Data

May 30, 1983 [DE] Fed. Rep. of Germany ....... 3319605

[51] Int. Cl.⁴ .............................................. G01L 9/06
[52] U.S. Cl. ...................... 73/727; 29/593; 29/610 SG; 73/721; 73/DIG. 4; 338/4; 338/9; 338/195

[58] Field of Search ................... 73/727, 721, DIG. 4; 338/195, 4, 9; 29/610 SG, 593, 25.35

[56] References Cited

U.S. PATENT DOCUMENTS 3,938,175  2/1976  Jaffe ............................... 29/610 SG
4,503,709  3/1985  Ruhle .................................... 73/727

Primary Examiner—Donald O. Woodiel
Attorney, Agent, or Firm—Herbert L. Lerner; Laurence A. Greenberg

[57] ABSTRACT

Sensor with polycrystalline silicon resistors which are applied to a substrate and are covered with a dielectric passivating layer, characterized by the feature that the resistors are thermally adapted by targeted adjustment of their dopings and by suitable healing, and are balanced by laser trimming.

23 Claims, 5 Drawing Figures

SENSOR WITH POLYCRYSTALLINE SILICON RESISTORS

BACKGROUND OF THE INVENTION

1. Field of the Invention

The invention relates to a sensor with polycrystalline silicon resistors which are applied to a substrate and are covered with a dielectric passivating layer.

2. Description of the Prior Art

The development of technically and economically capable sensors is of decisive importance for manufacturing a cost-effective periphery for microelectronics, measuring, control and regulating technology.

At the present time in the manufacture of sensors, the adjustment of the system parameters as well as the adjustment of the temperature dependencies, for instance by the external wiring of suitable resistors, can be managed only at great expense, and consequently such sensors are not used in the mass market. In the situation of externally wired resistors of sensors, the simultaneous adjustment of certain resistance values and certain associated temperature coefficients presents considerable difficulties. Thus, chrome-nickel resistors vapor-deposited for this purpose, for instance, can not as a practical matter be used.

SUMMARY OF THE INVENTION

An object of the present invention is to provide a sensor with resistors, which latter can be adjusted with respect to the resistance values as well as the associated temperature coefficients in a simple manner and which can, in addition, be employed in a technologically compatible and cost-effective way for being wired to components to be trimmed. In addition, a method for the economical production of such a sensor will be described.

With the foregoing and other objects in view, there is provided in accordance with the invention a sensor with polycrystalline silicon resistors which are applied to a substrate and are covered with a dielectric passivating layer, in which the resistors are thermally adapted by targeted adjustment of their dopings and by suitable healing, and are balanced by laser trimming.

In accordance with the invention, there is provided a method for manufacturing a sensor with polycrystalline silicon resistors which comprises (a) depositing a n-silicon layer epitaxially on an $n^+$-silicon substrate, (b) placing p-doped bridge resistors $R_b$ which form the sensor, into the n-silicon layer by means of phototechniques, (c) applying a silicon dioxide layer to the entire semiconductor substrate over the entire surface, (d) reducing the applied silicon dioxide layer in the region of the bridge resistors ($R_b$) to a smaller layer thickness by means of a phototechnique, (e) thereupon, depositing a thin silicon nitride layer over the entire surface, (f) applying amorphous silicon to the silicon nitride layer over the entire surface, (g) doping parts of the applied amorphous silicon layer to obtain one and maximally two doping concentrations, (h) depositing a passivating layer in a predetermined layer thickness over the entire surface of the entire semiconductor wafer, (i) performing laser healing of certain regions of the amorphous silicon layer wherein the laser illuminates the regions line by line, (j) performing oven-healing of the entire semiconductor wafer, (k) structuring the amorphous silicon layer, whereby different polysilicon resistors ($R_K$) and ($R_{K'}$) are formed, (l) performing a new passivation operation, (m) reducing the silicon substrate at the place of the bridge resistors ($R_b$) by means of etching on the back side, and (n) subjecting the polysilicon resistors ($R_K$ and $R_{K'}$) to a fine adjustment by means of laser trimming.

There is further provided a method for manufacturing a sensor with polycrystalline silicon resistors which comprises (a) depositing a n-silicon layer epitaxially on an $n^+$-silicon substrate, (b) applying a silicon dioxide layer to the entire semiconductor substrate over the entire surface, (c) optionally, depositing a thin silicon nitride layer thereon over the entire surface, (d) applying amorphous silicon over the entire surface on the silicon nitride layer or silicon oxide layer, (e) doping parts of the applied amorphous silicon layer to obtain one and maximally two different doping concentration, (f) subsequently, performing laser healing of regions of the amorphous silicon layer wherein the laser illuminates the regions line by line, (g) performing oven-healing of the entire semiconductor wafer, (h) structuring the amorphous silicon layer, whereby different polysilicon resistors together with the bridge resistors are produced as pressure sensors, (i) performing a new passivation operation, (j) reducing the thickness of the substrate layer at the location of the bridge resistors ($R_b$) by means of etching on the back side, and (k) subjecting the polycrystalline silicon resistors to a fine adjustment by means of laser trimming.

Other features which are considered as characteristic for the invention are set forth in the appended claims.

Although the invention is illustrated and described herein as embodied in a sensor with polycrystalline silicon resistors, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
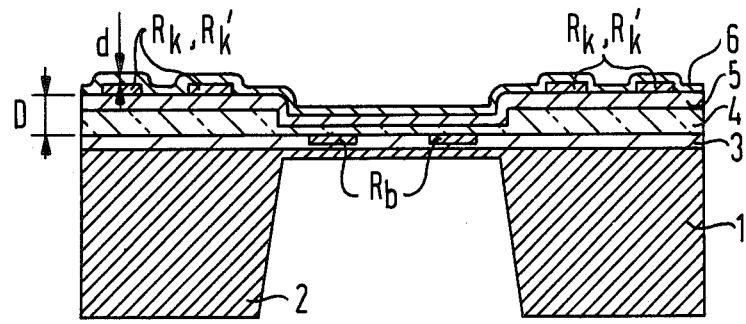
FIGS. 1 and 2 show cross sections through two embodiment examples of pressure measurement cells with balancing resistors.

The invention makes possible a circuit with a sensor measuring cell realized in planar silicon technology with a technology, compatible thereto, of recrystallizable, laser-adjustable polycrystalline silicon. The sensor measuring cell can be adjusted as to the parameters offset and sensitivity as well as to their temperature dependencies.

In the trimming method, the property of local healing of the polycrystalline layers can be carried out by laser radiation, and the laser trimming itself is performed by local destruction of the silicon layer. The laser cut is either programmed or controlled by simultaneous measurement of the respective resistance.

An optimum input coupling of the laser power is accomplished by $\lambda/4$ plates, i.e. a suitable dielectric cover layer which can simultaneously be used for passivating. Thus, the thickness d (see FIG. 1) of a nitride layer is $$d = \frac{\lambda vac \cdot (2i + 1)}{4 \cdot n}$$

with i=0, 1, 2 ... with the nitride used having an index of refraction n=2, which nitride is applied from the liquid phase through chemical vapor deposition (LPCVD) and with i=1, the value obtained for d=187.5 nm (1875 Å) if an argon laser is used. Tests with such layers show that a reduction of the required laser power of about 20% can be achieved. Further, it is important that traces approximately 100 μm wide can be recrystallized without problem, also with a line focus, without the occurrence of radiation damage at the edges of the structures.

The covered structures are distinguished from the not-covered structures by greater stability and narrower tolerances (for instance, spread of offset).

The application of a suitable base layer, on which the polycrystalline silicon is deposited is also of importance. Optimum reflection conditions, in addition to the polycrystalline structure, are obtained with layer thicknesses $D=n\cdot(\lambda/2)$ (see FIG. 1). Damage to the substrate is thereby avoided with certainty, and this base layer as an insulating layer is preserved.

The laser healing of polycrystalline resistor structures such as are used, for instance in pressure sensor measuring cells, may be carried out by conducting the laser beam parallel to the longitudinal extent of these structures. Through irradiation in this preferred direction, only few grains elongated in the longitudinal direction are generated and the influence of the grain boundaries on the layer resistance which is noticeable in irradiation transversely thereto in the doping range of interest, smaller than $10^{19}/cm^3$, is negligible.

The sensor measuring cells are doped differently by regions, as will be explained in detail in the following with the aid of the application example of a pressure sensor measuring cell.

The doping is preferably carried out by ion implantation into the deposited structured polycrystalline silicon layer. Structuring of the mutually insulated regions may be accomplished photolithographically by means of photoresist and etching in known manner.

The invention also provides an adjustable pressure sensor measuring cell with polycrystalline resistors and current or voltage output as desired, for direct connection to operation amplifiers.

Figure 3:
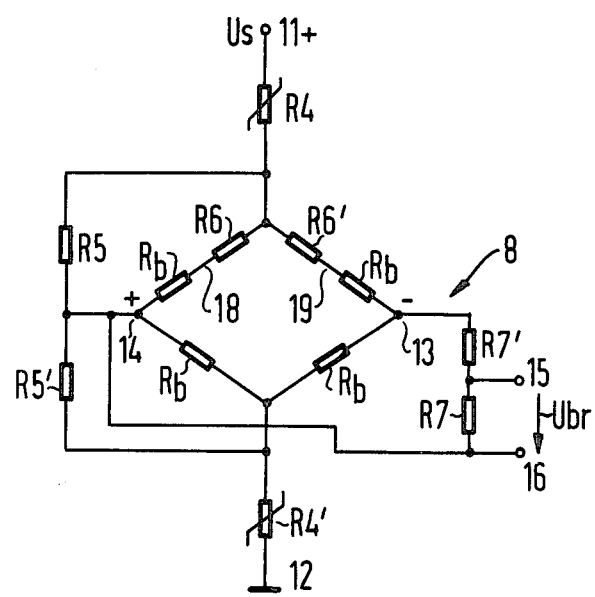
FIG. 3 is the circuit diagram of a pressure-measuring cell with adjusting resistors.
Figure 4:
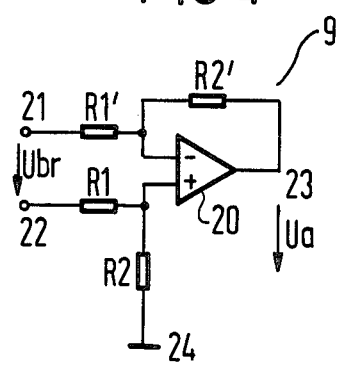
FIGS. 4 and 5 show circuit diagrams for wiring operational amplifiers.
Figure 5:
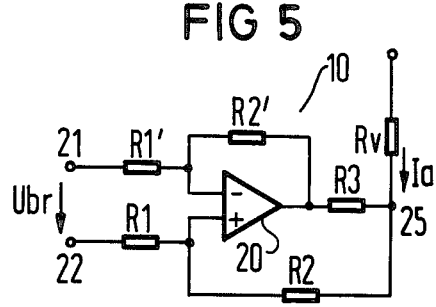

FIGS. 3–5 show schematically the pressure measuring cell with the necessary trimming elements as well as the externally-wired resistors for the operational amplifier.

Integration of the pressure measuring cell and the external wiring resistors for the operational amplifier together on a chip can be effected to obtain the current or voltage output variant with only one design by simply opening-up conductor runs. This assures cost effectiveness particularly for large quantity usage.

In FIG. 3, which shows a pressure measuring cell with trimming resistors, the following symbols are used:

$U_S$ = Supply voltage of the bridge
$U_b$ = Bridge signal
$R_b$ (appr. 2kΩ) = Piezoresistive bridge resistor
$R_4 = R_{4'}$ (500Ω) = Resistor with a high negative temperature coefficient (for instance $-40\%/100°$ K.) for compensating the temperature coefficient of the sensitivity.
$R_5 = R_{5'}$ (=50kΩ) = Resistor for offset temperature coefficient compensation
$R_6 = R_{6'}$ (=250Ω) = Resistor for offset adjustment
$R_7 = R_{7'}$ (=2.5kΩ) = Resistor for sensitivity adjustment In FIGS. 4 and 5 which show an operational amplifier with externally wired resistors for voltage and current output, the resistors $R_1$–$R_3$ are co-integrated and the following applies:

$$\begin{bmatrix} U_a = -\dfrac{R_2}{R_1} U_{br} \\ R_1 = 2 \ k\Omega \\ R_2 = 200 \ k\Omega \\ I_a = \dfrac{R_2}{R_1 - R_3} \cdot U_{br} \\ U_E = 0 \longrightarrow I_a = 0 \\ U_E = 50 \ mV \longrightarrow I_a = 20 \ mA \\ R_3 = 250\Omega \\ R_v = \text{Consumer.} \end{bmatrix}$$

The circuit according to the invention with polycrystalline resistors is laid out so that the required resistance values can be adjusted in the range of 250Ω to 200kΩ by only two different doses of the following implantation:

Resistance Group I: 250Ω to 2.5kΩ
Resistance Group II: 50kΩ to 200kΩ

Resistance values within a resistance group differ only by their geometric form.

All resistors, with the possible exception of the resistor pair $R_4$-$R_{4'}$ are healed by laser to obtain a temperature coefficient as negative as possible for compensating the temperature dependence of the sensitivity of the pressure sensor measuring cell.

The measurement of the sensor data at two pressures and two temperatures is basically required for the general function adjustment. The data obtained are stored and subsequently read into the computer of the trimming system.

The following values are then available:

$U_{A1}$ ... = f (released diaphragm and low temperature)
$U_{A2}$ ... = f (loaded diaphragm and low temperature)
$U_{A3}$ ... = f (released diaphragm and higher temperature)

$U_{A4} \ldots = f$ (loaded diaphragm and higher temperature).

By means of these values, the balancing is carried out in the cold condition by the trimming laser.

According to the invention, the general function trimming may be replaced by a simplified, particularly cost-effective function trimming with "thermally matched" polycrystalline silicon resistors. It is known that the temperature coefficient (TK) of polycrystalline silicon layers depends on the doping.

Extensive tests show that particularly with irradiation transversely to the longitudinal extent of the resistance structures, a negative temperature coefficient occurs in the doping range $N \leq 10^{19}$ cm$^{-3}$, which points to a thermally activated behavior of the grain boundary conductivity. With irradiation parallel to the longitudinal extent of the resistance structure, this effect was observed in the doping range $N \leq 10^{16}$ cm$^{-3}$.

The temperature coefficient of non-irradiated, fine-grain polycrystalline silicon structures is negative in the doping range $N = 10^{19}$ to $10^{20}$ cm$^{-3}$ examined, i.e. it is determined mainly by grain boundaries.

The temperature coefficient of heavily doped silicon layers, laser-healed parallel to the axis of the resistor, has a different behavior with concentrations $N \leq 10^{19}$ cm$^{-3}$, which is very close to the curve for monocrystalline silicon.

It follows that the temperature coefficient in the doping range which is of special interest for pressure sensors, with concentrations between $N = 10^{18}$ and $10^{19}$ cm$^{-3}$, has a zero crossing which is to be exploited in the following trimming strategy.

The trimming concept according to the invention with "thermally matched" polycrystalline silicon resistors provides in particular the following applications:

1. The starting point of an output circuit optimized as to magnitude with respect to the resistance such as is given, for instance, in FIGS. 3-5. Through the choice of the compensation resistors $R_5 = R_{5'} = 50k\Omega$ as compared to the chosen resistances of the bridge by $2k\Omega$, care is taken for sufficient offset temperature coefficient compensation.

2. In this case, the same temperature behavior of the bridge resistors and of the balancing resistor $R_6$, $R_{6'}$ for trimming the offset magnitude is achieved by setting the same doping for the mentioned resistors. The resistors $R_5$, $R_{5'}$ can be omitted here. After the offset is trimmed to zero, the temperature coefficient of the offset therefore also has the value zero.

3. As a special case thereof (see item 2) not only is the same temperature behavior of the bridge resistors and the compensating resistors $R_6$, $R_{6'}$ adjusted to the same temperature behavior, but the temperature behavior is brought to TK=0. By this measure, the advantage of a temperature-independent internal resistance of the bridge circuit is achieved in addition to case 2. This, however, is counterbalanced by a certain loss of sensitivity as compared to case 2. The advantages and disadvantages must be weighed in each application.

4. By suitable doping of the bridge resistors and the balancing resistor $R_6$, $R_{6'}$, the temperature dependence of the sensitivity is set to zero.

Thus, the resistors $R_4$, $R_{4'}$ can also be omitted. As is well known, the piezoresistive effect, i.e. the strain sensitivity of semiconductors, can be expressed by the K-factor. It is defined by $$K = \frac{\Delta R}{R_0} \cdot \frac{1}{\epsilon}$$

where $\Delta R$ signifies the change of the resistance under stress $\epsilon$ and $R_o$ is the resistance value of the unloaded resistor.

Test on differently doped polycrystalline silicon layers which were subsequently recrystallized by laser, showed that the temperature coefficient of the sensitivity decreases with increasing doping, while the corresponding K-factors does not assume insignificantly small values.

With a layer doping of $N = 6 \cdot 10^{18}$ cm$^{-3}$, the temperature dependence of the sensitivity is still 20%/100° K. The K-factor attainable with the chosen bridge design is about 50.

By adjusting a layer doping $N = 2 \cdot 10^\circ$cm$^{-3}$, the temperature dependence of the sensitivity is eliminated. The corresponding K-factor was only halved.

It should be pointed out that at the chosen high dopings, K-factors of this order of magnitude can be adjusted only by laser recrystallization. With pure oven healing, the values are distinctly lower.

5. The adjustment of the sensitivity is not performed on the resistor $R_7$, $R_{7'}$ to obtain a sensitivity-standardized pressure measuring cell, but on the integrated externally wired resistors for the operational amplifiers $R_2/R_1$ or $R_2/R_1 \cdot R_3$, respectively.

This type of trimming is particularly advantageous in special applications involving large quantities. The user needs a normalized output signal $U_A$ or $I_A$, respectively, at the output of the operational amplifier. The resistor $R_7$, $R_{7'}$ can be omitted. At the same time, the loss of sensitivity (approximately 30%) which goes along with the trimming of $R_7$, $R_{7'}$ for adjusting a sensitivity-normalized pressure sensor measuring cell, is canceled.

The temperature curve and thereby the doping of the resistors $R_1 \ldots R_3$ is adapted to the respective application listed in paragraphs 1-5 above.

The invention is based on the following considerations:

Measurements on polysilicon have shown that a change in the doping leads not only to a change in the resistance but also to a change of the temperature coefficient of the resistance. In polycrystalline silicon, healing processes lead to changes of the resistance value as well as to changes of the corresponding temperature coefficient. Because of the ability to adjust via doping as well as healing conditions, relevant characteristics such as, for instance, the layer resistance and the temperature coefficient, a relatively simple adjustment of components can be carried out within a wide range in a targeted manner, with respect to the resistance and, for instance, the pressure sensitivity. If all necessary externally wired resistors are arranged on a substrate with the semiconductor component to be adjusted, a cost-effective temperature-independent and offset-free component can thus be produced by suitable trimming which can furthermore be connected directly to an operational amplifier.

According to the invention, it is furthermore advantageous to make the thickness d of the passivating layer such that optimum input of the laser power is assured, i.e. the thickness of the nitride layer (d) is as follows:

$$d = \frac{\lambda vac \cdot (2i + 1)}{4n_1}$$

where λ vac is the wavelength of the laser power in vacuum used, i equals zero or a natural number and $n_1$ the index of refraction of the passivating layer. By this advantageous input coupling of the laser power, a reduction of the required laser power by approximately 20% can be achieved. This is important in maintaining the stability of the passivating layer and retaining the condition of the substrate intact. In addition, perfectly recrystallized traces about 100 μm wide can be generated if a laser with line focus is used, without the occurrence of radiation damage at the edges of the structures, particularly at the passivating layer.

The resistors covered with the passivating layer of the layer thickness indicated are distinguised from differently covered or not covered resistors in corresponding sensors by the fact that the stability of the sensors is higher and their tolerances (for instance offset spread) are narrower.

It is further advantageous, according to the invention, that the substrate underneath the adjustable polycrystalline silicon resistors contains at least one insulating layer provided with optimum reflection conditions with the thickness D as follows:

$$D = \frac{\lambda vac \cdot (i + 1)}{2n_2}$$

where λ vac is the wavelength of the laser power used in the vacuum, i equals zero or a natural number, and $n_2$ the index of refraction of the insulating layer. By this measure, damage to the substrate by laser radiation is avoided and the insulating effect of the substrate is advantageously fully preserved.

According to the invention, it is further advantageous if the semiconductor component to be trimmed consists of trimmable, doped polycrystalline silicon resistors. This measure simplifies the manufacturing process substantially. Semiconductor components that can be trimmed are pressure, temperature and position sensors.

In the following, the invention will be explained in greater detail with reference to the drawings and to embodiment examples of a pressure sensor.

The sensor, the balancing resistors and operational amplifiers can also be integrated monolithically on a chip.

FIG. 1 shows a n+ silicon substrate 2 on which a n-silicon layer 3 is deposited epitaxially. P-doped bridge resistors $R_b$ are inserted into the n-doped silicon layer 3, for instance, by means of implantation. A silicon dioxide layer 4 is deposited over the entire surface on the n-doped silicon layer 3. The layer thickness of silicon dioxide layer 4 is reduced in the area of the bridge resistors $R_b$. The specific choice of the substrate and the attachment of p-doped bridge resistors is made in view of generating pressure sensors, taking into consideration the crystal orientation which is optimum for the pressure sensitivity. On top thereof, a thin silicon nitride layer 5 can additionally be deposited over the entire surface. The trimming resistors $R_K$ and $R_{K'}$ in the form of polysilicon resistors are arranged on top of the thick-film parts of the silicon dioxide layer 4 and the corresponding parts of the silicon nitride layer 5. K means a natural number between 1 and 7. $R_K$ and $R_{K'}$, respectively, are the correspondingly designated resistors from FIGS. 3–5. The resistors $R_K$ and $R_{K'}$, respectively, can therefore not only be trimming resistors for a pressure measuring cell, they can also be externally wired resistors for operational amplifiers, as for instance, according to FIGS. 4 and 5.

The trimming resistors $R_K$ and $R_{K'}$ are covered by placing a passivating layer 6 consisting of, for instance, silicon nitride, over the entire surface. The passivating layer 6 is formed as a λ/4 layer so that the thickness d is as follows:

$$d = \lambda vac \cdot \frac{(2i + 1)}{4n_1}$$

where λ vac stands for the wavelength of the laser power used in the vacuum, i equals zero or a natural number, and $n_1$ is the index of refraction of the passivating layer 6. The thickness D of the insulating layer underneath the trimming resistors $R_K$ and $R_{K'}$, respectively, is practically equivalent to the thickness of the silicon dioxide layer 4, since the thickness of the silicon nitride layer 5 may be ignored. The insulating layer is formed as a λ/2-layer in order to obtain optimum reflection conditions, and its thickness D is:

$$D = \frac{\lambda vac(i + 1)}{2n_2}$$

where λ vac is the wavelength of the laser power used in vacuum, i equals 0 or a natural number, and $n_2$ is the index of refraction of the silicon dioxide layer 4.

The thickness of the n+-doped silicon substrate 2 is reduced in the region of the bridge resistors $R_b$, in order to form a thin-film pressure-sensitive sensor chip in the region of the bridge resistors $R_b$.

By making the passivating layer 6 a λ/4 layer, optimum input coupling of the laser power into the polycrystalline silicon resistors is obtained. The required laser power can therefore be reduced by 20%. By using an argon laser with line focus, widths of about 100 μm can be recrystallized perfectly without problem, without radiation damage occurring at the edges of the structures. By forming the insulating layer, i.e. the silicon dioxide layer 4 and the silicon nitride layer 5 underneath the polysilicon resistors, as a λ/2 layer, optimum reflection conditions at the insulating layer are created, thereby preventing the laser radiation from penetrating into the insulating layer or passing through the insulating layer. This prevents damage to the substrate. In particular, the insulating effect of the insulating layer is preserved.

Figure 2:
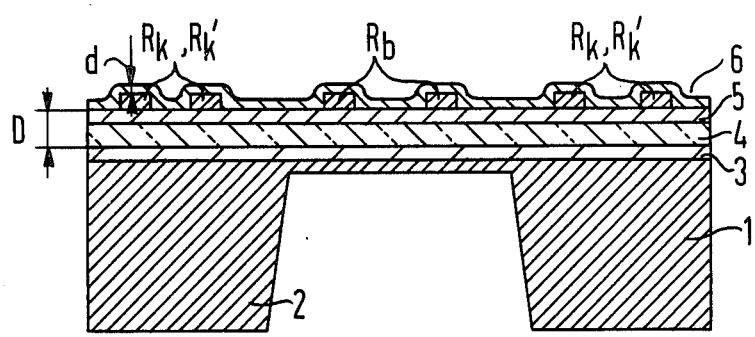

A second embodiment example of a pressure sensor cell with trimming resistors $R_K$ and $R_{K'}$ is shown in FIG. 2. The same objects in FIG. 1 are provided with the same reference symbols and will not be explained here again. In contrast to FIG. 1, the bridge resistors $R_b$ are polysilicon resistors. In contrast to FIG. 1, the silicon dioxide layer 4 and the silicon nitride layer 5 have constant layer thickness over the entire semiconductor surface. The polysilicon bridge resistors $R_b$ are arranged in FIG. 2 on the pressure-sensitive diaphragm such that maximum pressure sensitivity is obtained.

Any other suitable substrate can be used for manufacturing other sensors, such as temperature sensors, position sensors or other trimmable semiconductor components.

FIG. 3 shows a circuit diagram 8 for wiring a sensor measuring cell with trimmable resistors. The sensor cell proper is formed by the bridge resistors $R_b$.

The supply voltage $U_S$ is applied to the bridge input at a terminal 11, while the terminal 12 is grounded. A bridge signal $U_{br}$ is fed to the outputs 15 and 16 via the bridge terminals 13, 14. The trimming resistors $R_6$ and $R_{6'}$ are arranged for fine balancing of the bridge arms 18 and 19 and serve for balancing-out the offset. The magnitude of the resistors $R_6$ and $R_{6'}$ is 250Ω while the resistance of the bridge resistors $R_b$ is about 2 kΩ. According to their functions the resistors $R_6$ and $R_{6'}$ should have approximately the same temperature coefficient with respect to the resistance value as the bridge resistors $R_b$. Balancing resistors $R_5$ and $R_{5'}$ together with the trimming resistors, serve for balancing the temperature coefficient of the offset of the entire bridge. The temperature coefficient of the resistance of $R_5$ and $R_{5'}$ is to be approximately 0; the resistance of the resistors $R_5$ and $R_{5'}$ is to be 50 k ohm. The balancing resistors $R_4$ and $R_{4'}$ serve for compensating the temperature dependence of the pressure sensitivity. The temperature coefficient of the resistors $R_4$ and $R_{4'}$ must be negative and as large as possible, which is indicated by the corresponding symbol in the drawing. The balancing resistors $R_7$ and $R_{7'}$, together with the balancing resistors, serve for the exact adjustment of the sensitivity of the overall bridge arrangement. Sensitivity variations of the bridge arrangement may be due, for instance, to thickness variations of diaphragm. The temperature coefficient with respect to the resistors $R_7$ and $R_{7'}$ should be equal to the temperature coefficient of the bridge. The resistors $R_7$ and $R_{7'}$ should have a resistance value of 2.5 k ohm.

FIG. 4 shows the circuit diagram 9 for wiring an operational amplifier 20 whereby, in addition to an amplifier function, an inverter function is also obtained. The wiring resistors $R_1$ and $R_{1'}$ are 2 kΩ, the resistors $R_2$ and $R_{2'}$ are 200 kΩ and the resistor $R_3$ is 250Ω. The bridge voltage $U_{br}$ is applied to the input 21, 22 of the circuit diagram 9, while the output volage $U_a$ can be taken off at point 23. An output terminal 24 is grounded. The circuit diagram 9 has an output voltage $$U_a = -\frac{R_2}{R_1} U_{br}$$

where $R_1$ and $R_2$ are the wired-up resistors and $U_{br}$ is the bridge voltage.

FIG. 5 shows a circuit diagram 10 for wiring an operational amplifier 20 as the current output variant without inverter function, in contrast to FIG. 4. The resistors $R_1$, $R_{1'}$, $R_2$, $R_{2'}$, $R_3$ serve for wiring the operational amplifier 20, while $R_v$ indicates a connected consumer resistor. The bridge voltage $U_{br}$ is applied as in FIG. 4 at the points 21, 22 of the input. At the point 25, the output signal in the form of the current $I_a$ can be taken off and fed to the consumer resistor $R_v$. The current gain $I_a$ is in accordance with:

$$I_a = \frac{R_2}{R_1 \cdot R_3} U_{br}$$

where $R_1$, $R_2$, $R_3$ are the wiring resistors according to FIG. 5 and $U_{br}$ is the bridge voltage.

The wiring resistors $R_1$, $R_{1'}$, $R_2$, $R_{2'}$ and $R_3$ according to FIGS. 4 and 5 can be arranged, depending on the request of the customer, together with the balancing resistors of the bridge as polysilicon resistors on the chip of a pressure sensor cell according to FIGS. 1 or 2 as resistors $R_K$ and $R_{K'}$.

In order that the balancing resistors according to FIG. 3 and the wiring resistors according to FIGS. 4 and 5 can be realized as polycrystalline resistors on a semiconductor chip, only two different dopings in the range of 250Ω to 200 kΩ need be applied. Because great accuracy of the nominal resistance can be obtained with ion implantation, implantation is preferred over other types of doping. Ion implantation is of course a known procedure for doping. The preferred doping materials are boron, arsenic and phosphorous.

Two resistor groups, namely the resistance group I between 250Ω and 2.5 kΩ and the resistance group II between 500 kΩ and 200 kΩ can be formed by two different dopings. Resistance values within a resistor group can be adjusted by different geometric forms.

All balancing resistors $R_K$ and R· can be laser-healed according to FIG. 3.

The resistors $R_4$ and $R_{4'}$ which are characterized by a large negative temperature coefficient, are either laser-healed so that the direction of the current in the resistance is transversely to the laser scan direction, or the resistors are healed in an oven.

With the other laser-healed balancing resistors according to FIG. 3, on the other hand, care is taken that the direction of the laser scan raster is parallel to the direction of the current in the resistor, whereby a positive temperature coefficient with respect to the resistance or a temperature coefficient approximately equal to zero can be adjusted with very good reproducibility.

Basically, the measurement of the sensor signals at two different pressures and two different temperature is required for the general function adjustment of a pressure sensor cell according to FIG. 1 or FIG. 2, as was explained above.

In the manufacture of pressure sensors, using the invention, several balancing resistors can be saved, i.e. omitted, in certain important special cases, whereby the production and sensor can advantageously be cost-reduced.

In one special case, the same temperature behavior of the bridge resistors $R_b$ and the balancing resistors $R_6$, $R_{6'}$, can be adjusted so that the temperature coefficient of the resistance is zero.

Through this measure, the advantage of a temperature-independent internal resistance of the bridge circuit is additionally achieved, this advantage, however, is counterbalanced by a certain amount of loss of sensitivity. The advantages and disadvantages must be weighed against each other in each application.

In a second special case, the temperature dependence of the sensitivity of the bridge is set to zero via a suitably high doping of the bridge resistors and the balancing resistor $R_6$, $R_{6'}$.

Thereby, the resistors $R_4$, $R_{4'}$, can be eliminated. As is well known, the piezoresistive effect, i.e. the strain sensitivity of semiconductors can be expressed by the K-factor. It is defined by $$K = \frac{\Delta R}{R_0} \frac{1}{\epsilon}$$

where $\Delta R$ is the change of the resistance under stress $\epsilon$ and $R_o$ is the resistance value of the unloaded resistor.

Tests on differently doped polycrystalline silicon layers which had subsequently been recrystallized by laser, showed that the temperature coefficient of the sensitivity decreases with increasing doping, while the corresponding K-factors decrease but to relatively higher significant values.

With a layer doping of $N = 6 \cdot 10^{18}$ cm$^{-3}$, the temperature dependence of the sensitivity is still 20% per 100° K. The K-factor which can be attained with the bridge circuit according to FIG. 3 is about 50.

By adjusting layer doping $N = 2 \cdot 10^{20}$ cm$^{-3}$, the temperature dependence of the sensitivity is eliminated. The corresponding K-factor is only halved.

It should be pointed out that with the heavy chosen dopings, K-factors of this order of magnitude can be adjusted only by laser recrystallization. The values with oven healing are distinctly lower.

In a third special case, for fabricating a sensitivity-normalized pressure measuring cell, the adjustment of the sensitivity is not performed at the resistor $R_7$, $R_{7'}$ but at the integrated wiring resistors for the connected operational amplifier $R_2/R_1$ and $R_2/R_1 \cdot R_3$.

This type of proposed balancing is particularly advantageous in special applications with large quantities. The sensor needs a normalized output signal $U_A$ or $I_A$ at the output of the operational amplifier. The resistor $R_7$, $R_{7'}$ can be omitted. At the same time, the loss of sensitivity (approximately 30%), which is connected with the balancing at $R_7$, $R_{7'}$, for setting up a sensitivity-normalized pressure sensor measuring cell, is canceled.

The temperature curve of the resistors and thereby the doping of the resistors must be adapted to the respective special case.

The application of resistors which can be adjusted in accordance with the invention, is in no way limited to the application in pressure sensor cells. Resistors according to the invention can rather be used in all adjustable semiconductor components, for instance, temperature sensors, position sensors or also in operation amplifiers in any application.

The foregoing is a description corresponding, in substance, to German application P 33 19 605.2, dated May 30, 1983, international priority of which is being claimed for the instant application, and which is hereby made part of this application. Any material discrepancies between the foregoing specification and the specification of the aforementioned corresponding German application are to be resolved in favor of the latter.

We claim:

1. Sensor with polycrystalline silicon resistors which are applied to a substrate and are covered with a dielectric passivating layer, in which temperature coefficients and resistance values of the resistors are adjusted and equalized by laser trimming, by doping the resistors and by healing with partial recrystallization of the resistors by laser healing with application of laser radiation or oven healing.

2. Sensor according to claim 1, wherein resistors which are adjusted by laser healing by application of laser radiation, the thickness d of the passivating layer is $$d = \frac{\lambda vac(2i + 1)}{4n_1}$$

where $\lambda$ vac is the wavelength of the laser radiation used in a vacuum, i is zero or a natural number, and $n_1$ is the index of refraction of the passivating layer, whereby optimum input coupling of the laser radiation is assured.

3. Sensor according to claim 2, wherein the substrate contains underneath the polycrystalline silicon resistors, at least one insulating layer provided with optimum reflection conditions, of the thickness $$D = \frac{\lambda vac(i + 1)}{2n_2}$$

where $\lambda$ vac is the wavelength of laser radiation used in a vacuum, i is zero or a natural number, and $n_2$ the index of refraction of the insulating layer.

4. Sensor according to claim 2, wherein the resistors are piezoresistive and are arranged in a bridge circuit, to form a pressure measuring device.

5. Sensor according to claim 2, wherein the resistors form a temperature sensor or a position sensor.

6. Sensor according to claim 1, wherein the substrate contains underneath the polycrystalline silicon resistors, at least one insulating layer provided with optimum reflection conditions, of the thickness $$D = \frac{\lambda vac(i + 1)}{2n_2}$$

where $\lambda$ vac is the wavelength of laser radiation used in a vacuum, i is zero or a natural number, and $n_2$ the index of refraction of the insulating layer.

7. Sensor according to claim 6, wherein the resistors are piezoresistive and are arranged in a bridge circuit, to form a pressure measuring device.

8. Sensor according to claim 6, wherein the resistors form a temperature sensor or a position sensor.

9. Sensor according to claim 1, wherein the resistors are piezoresistive and are arranged in a bridge circuit, to form a pressure measuring device.

10. Sensor according to claim 9, wherein the resistors form additionally compensating resistors of the bridge circuit, which bring about a compensation of the temperature coefficient of the offset of the bridge.

11. Sensor according to claim 9, including an operational amplifier following the bridge, and wherein polycrystalline resistors are connected between the bridge and the operational amplifier.

12. Sensor according to claim 1, wherein the resistors form a temperature sensor or a position sensor.

13. Sensor according to claim 1, wherein the doping concentration of the resistors has the value $2 \cdot 10^{20}$ cm$^{-3}$.

14. Sensor according to claim 1, wherein the resistors are arranged in a bridge circuit to form a measuring device.

15. Sensor with polycrystalline silicon resistors which are applied to a substrate and are covered with a dielectric passivating layer, in which temperature coefficients and resistance values of the resistors are adjusted and equalized by laser trimming, by doping the resistors and by healing with partial recrystallization of the resistors by laser healing with application of laser radiation or oven healing, wherein the resistors are piezoresistive and are arranged in a bridge circuit, to form a pressure measuring device, wherein the resistors form additionally balancing resistors which have the same doping as the piezoresistive resistors to bring about compensation of the temperature coefficient of the bridge.

16. Sensor according to claim 15, wherein the piezoresistive resistors and the balancing resistors are doped to give a zero value for the temperature coefficient.

17. Sensor according to claim 16, wherein the doping concentration of the resistors is between $10^{18}$ and $10^{19}$ cm$^{-3}$.

18. Sensor according to claim 17, wherein the doping is carried out with a doping material selected from the group consisting of boron, arsenic and phosphorous.

19. Sensor according to claim 16, wherein the doping is carried out with a doping material selected from the group consisting of boron, arsenic and phosphorous.

20. Sensor according to claim 15, wherein the doping is carried out with a doping material selected from the group consisting of boron, arsenic and phosphorous.

21. Sensor with polycrystalline silicon resistors which are applied to a substrate and are covered with a dielectric passivating layer, in which temperature coefficients and resistance values of the resistors are adjusted and equalized by laser trimming, by doping the resistors and by healing with partial recrystallization of the resistors by laser healing with application of laser radiation or oven healing wherein the resistors are piezoresistive and are arranged in a bridge circuit, to form a pressure measuring device, wherein the piezoresistive resistors are doped to give a zero value temperature dependence of their sensitivity.

22. Method for manufacturing a sensor with polycrystalline silicon resistors which comprises
    (a) depositing a n-silicon layer epitaxially on an n$^+$-silicon substrate,
    (b) placing p-doped bridge resistors R$_b$ which form the sensor, into the n-silicon layer by means of phototechniques,
    (c) applying a silicon dioxide layer to the entire semiconductor substrate over the entire surface,
    (d) reducing the applied silicon dioxide layer in the region of the bridge resistors (R$_b$) to a smaller layer thickness by means of a phototechnique,
    (e) thereupon, depositing a thin silicon nitride layer over the entire surface,
    (f) applying amorphous silicon to the silicon nitride layer over the entire surface,
    (g) doping parts of the applied amorphous silicon layer to obtain one and maximally two doping concentrations,
    (h) depositing a passivating layer in a predetermined layer thickness over the entire surface of the entire semiconductor wafer,
    (i) performing laser healing of certain regions of the amorphous silicon layer wherein the laser illuminates the regions line by line,
    (j) performing oven-healing of the entire semiconductor wafer,
    (k) structuring the amorphous silicon layer, whereby different polysilicon resistors (R$_K$) and (R$_{K'}$) are formed,
    (l) performing a new passivation operation,
    (m) reducing the silicon substrate at the place of the bridge resistors (R$_b$) by means of etching on the back side, and
    (n) subjecting the polysilicon resistors (R$_K$ and R$_{K'}$) to a fine adjustment by means of laser trimming.

23. Method for manufacturing a sensor with polycrystalline silicon resistors which comprises
    (a) depositing a n-silicon layer epitaxially on an n$^+$-silicon substrate,
    (b) applying a silicon dioxide layer to the entire semiconductor substrate over the entire surface,
    (c) optionally, depositing a thin silicon nitride layer thereon over the entire surface,
    (d) applying amorphous silicon over the entire surface on the silicon nitride layer or silicon oxide layer,
    (e) doping parts of the applied amorphous silicon layer to obtain one and maximally two different doping concentration,
    (f) subsequently, performing laser healing of regions of the amorphous silicon layer wherein the laser illuminates the regions line by line,
    (g) performing oven-heating of the entire semiconductor wafer,
    (h) structuring the amorphous silicon layer, whereby different polysilicon resistors together with the bridge resistors are produced as pressure sensors,
    (i) performing a new passivation operation,
    (j) reducing the thickness of the substrate layer at the location of the bridge resistors (R$_b$) by means of etching on the back side, and
    (k) subjecting the polycrystalline silicon resistors to a fine adjustment by means of laser trimming.

* * * * *